April 28, 1953          W. A. LAW          2,636,917
MEANS FOR DETECTING THE PRESENCE OF UNDESIRED
METALLIC PROJECTIONS ON NONMETALLIC SURFACES
Filed March 31, 1950                  2 SHEETS—SHEET 1
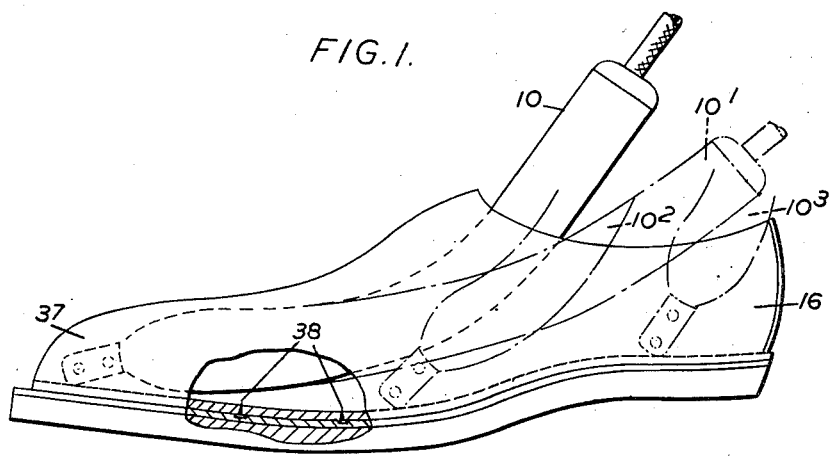
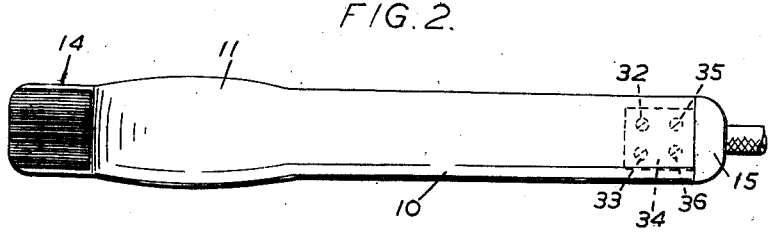
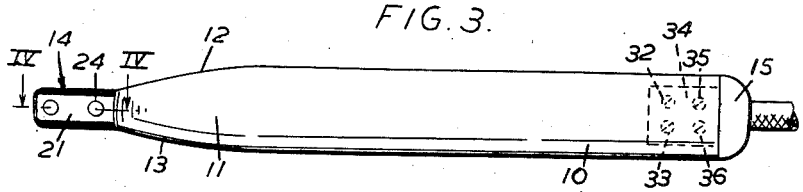
Inventor
William A. Law
By April 28, 1953             W. A. LAW            2,636,917
MEANS FOR DETECTING THE PRESENCE OF UNDESIRED
METALLIC PROJECTIONS ON NONMETALLIC SURFACES
Filed March 31, 1950                                 2 SHEETS—SHEET 2
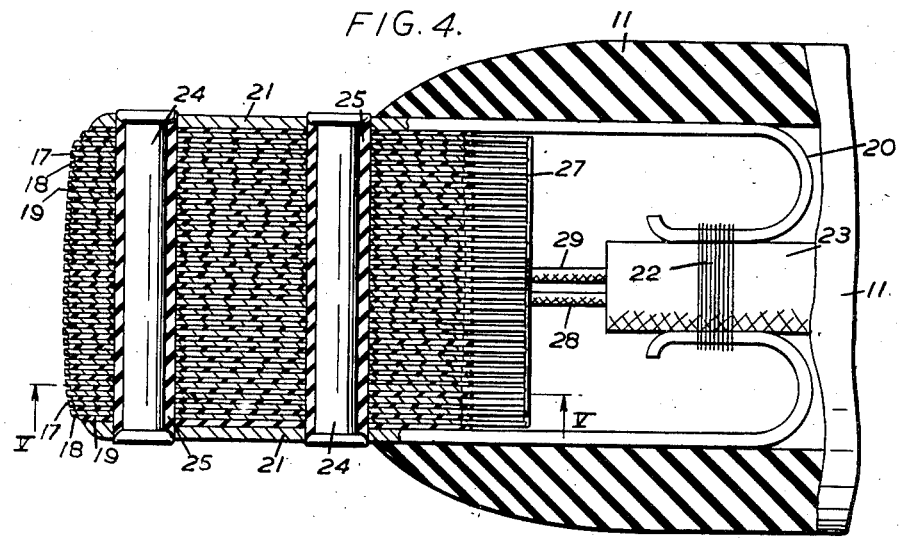
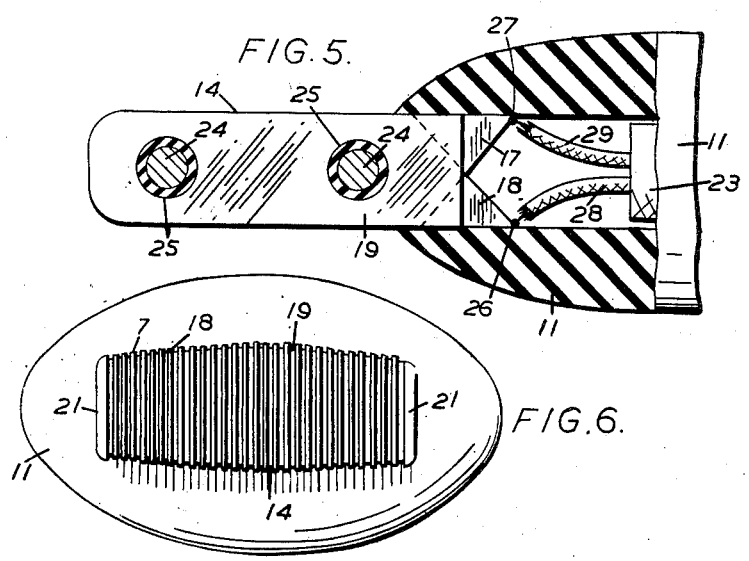
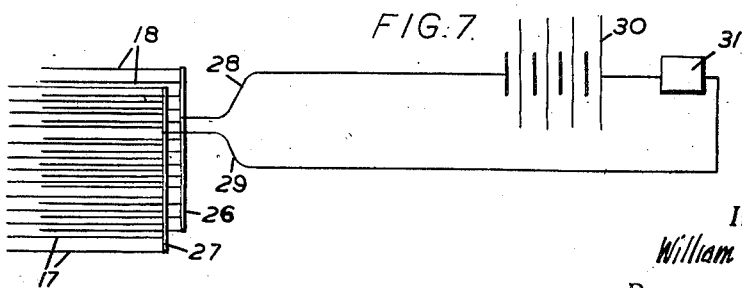
Inventor
William A. Law
By Jerome M. Paxton
Agt.

Patented Apr. 28, 1953

2,636,917

UNITED STATES PATENT OFFICE 2,636,917

MEANS FOR DETECTING THE PRESENCE OF UNDESIRED METALLIC PROJECTIONS ON NONMETALLIC SURFACES

William A. Law, Kettering, England

Application March 31, 1950, Serial No. 153,028
In Great Britain April 6, 1949

5 Claims. (Cl. 173—273)

This invention relates to means for detecting the presence of undesired metallic projections on non-metallic surfaces.

In this connection the invention is concerned more particularly with means for detecting and indicating the presence of points or protruding ends of tacks, nails or analogous securing elements used to secure together two or more pieces or layers of non-metallic material—especially in confined spaces where the surface from which such points or ends are likely to project is wholly or mainly hidden from view.

It is principally the intention to adapt the invention for use in detecting and indicating the undesired presence of tack points and like projections on the insoles of boots and shoes of the kind wherein tacks are inserted to hold the insole to the last, and also to hold the upper to the insole. This accordingly applies not only to boots and shoes of the welted type, including those made with a stapled welt, but also for instance to boots and shoes having rivets uniting a middlesole, upper and insole.

Heretofore, it has been the common practice, at the appropriate stage in the manufacture of boots and shoes of the kind concerned, to discover, preparatory to their removal, undesired tack, staple or rivet points by inserting the hands within the uppers and moving the bare fingers over the surface of the insole. This method, although effective, tears the flesh and inflicts injury upon the fingers.

The principal object of the present invention is to provide simply constructed and relatively inexpensive means of an efficient character for electrically detecting and indicating the undesired presence of tack points and other projections on the insoles of boots and shoes, thereby obviating the necessity for insertion of the hands into the uppers.

The means constituting the invention may, however, with modifications, if necessary, be used for analogous purposes.

The detector according to this invention comprises a probing head and a handle for manipulating the head, said head carrying two sets of exposed conducting elements, the individual elements of the one set alternating with those of the other set, and said sets of elements being respectively connected in an electrical circuit adapted, when contact is made between two adjacent elements, to cause operation of a signalling device.

The electrical circuit will include a signalling device of any suitable character adapted to be operated, whenever the circuit is energized as aforesaid, to afford an indication of the presence of a metallic projection. The device may give an aural or/and a visual indication. Thus, whilst it is preferred to employ a bell, buzzer or the like designed to produce or emit an arresting sound, it is also within the scope of the invention to use a lamp, coloured or otherwise, which will wink to indicate the presence of tack points or other projections, or even a meter or similar instrument incorporating a movable indicator.

The source of current for supplying the circuit may consist of a battery, although current may be derived from a mains supply through a transformer.

Conveniently the conductive elements comprise a series of plates mounted in parallel fashion in the appliance so as to make edgewise contact with external objects, these plates being alternatively connected to one or the other of two terminals each connected to a lead extending through the handle. The plates are interleaved with sheets of insulating material to form a composite assembly or pack, and are clamped together in this condition and mounted in the head of the appliance to form a projecting nose.

According to a further feature of the invention the exterior surfaces of the detector are made smooth to enable it to be readily moved over the surface to be tested.

The detector may advantageously be fitted with a handle of insulating material designed to facilitate movement of the detector over the surface. Where, as hereinbefore mentioned, it is principally the intention to use the detector in enclosed or confined spaces, such as boot or shoe interiors, the handle may be made resilient.

One specific constructional example of the invention is illustrated in the accompanying drawings, which show a detector for use in locating and signalling the presence of exposed tack points and the like on the insoles of boots and shoes. In the drawing:

Figure 1 is a representation of the detector in various positions as it is moved over the insole of a shoe.

Figure 2 is a plan view of the detector.

Figure 3 is a side view of the same.

Figure 4 is an enlarged section on the line IV—IV of Figure 2.

Figure 5 is a cross-section taken on the line V—V of Figure 4.

Figure 6 is a front end view of the detector, on the same scale as the preceding two figures.

Figure 7 is a diagram representing the wiring connections of the instrument.

The detector has a relatively elongated body 10, intended to be held in the hand of the user; at its front or working end 11 the body 10 is somewhat bulged laterally (see Fig. 2) but is smoothly tapered at its upper and lower sides 12 and 13 respectively. Received and secured in the end 11 is a contact assembly 14, to be later described, and at the other end is a cap 15. The body is in the form of a sleeve and is made of flexible material to enable it to be deformed and thus reach into otherwise inaccessible or difficultly accessible places or to traverse an area without much movement of the hand of the user. Thus in Figure 1 one observes the body 10 in various different typical positions which it can assume in "searching" the insole of the shoe 16, these positions being denoted 10, $10^1$, $10^2$, and $10^3$.

The body or handle 10 of the appliance is conveniently made of rubber, not only because of the resilient characteristics of the latter, but also since it is an electrically-insulating material.

The contact assembly 14 consists of a pack of conductive plates 17 and 18 which are arranged in parallel fashion so as to make edgewise contact with external objects, and spaced by interleaving insulating sheets 19. The plates 17 and 18 may conveniently be of phosphor bronze or copper, and have a thickness of .020 inch, whilst the sheets 19 will be of mica or other hard insulating material of, for example, .015 inch thickness.

The pack of plates 17 and 18 and sheets 19 are secured and clamped in a holder 20, comprising two side plates 21 which are bent round at their rear ends and there secured by binding 22 to a rearwardly-extending textile sleeve 23. Connecting the pack between holder plates 21 are a pair of rivets 24 passing through insulating sleeve 25 in registering apertures in the plates and sheets. It will be noted that the front end corners of the contact plates and holder are rounded off and that the plates are made of varying height at the front end so that the assembly 14 corresponds very approximately to the configuration of the tapered end 11 of the body 10. This provides the instrument with a nose having a transverse section somewhat rounded at the top and bottom sides and therefore suitable for insertion into an out-of-the-way part, such as the toe interior, of a boot or shoe to be tested.

At its rear end, each of the contact plates 17 and 18 is bevelled, one set of alternate plates (viz. 17) having upwardly tapered ends, whilst the other set of plates 18 are downwardly tapered (see Figure 5). The pointed tail ends of the plates 18 are interconnected by a common transverse terminal bar 26, whilst those of plates 17 are similarly linked by a second terminal bar 27 which is located above and parallel to, but spaced from, the bar 26. Wiring leads, 28 and 29 respectively, are attached to the bars 26 and 27 and pass out through the sleeve 23 to be connected in an alarm or signalling circuit as illustrated diagrammatically in Figure 7. This circuit includes a supply source 30, e. g. a battery or mains supply (the latter via a transformer, not shown), and a signalling device indicated by 31.

The leads 28 and 29 are secured to screw terminals 32 and 33 (see Figs. 2 and 3) of a connector block 34 located in the handle 10 adjacent the end closed by cap 15. These terminals are respectively electrically connected to terminals 35 and 36 to which are secured the leads to the power source 30 and signalling device 31. Hence, in the event of the wires fraying or breaking at the entrance to the handle, a repair can be quickly effected.

In use, as indicated by Figure 1, the detector appliance can be inserted into the interior of a boot or shoe and the nose 14 moved about over the insole or other surface. Because of the resilient character of the body probing into the otherwise inaccessible interior of the toe 37 becomes very simple and positive the handle being for instance inserted in the shoe in the status indicated by 10, then relaxed into the position $10^1$ and pushed forward to the end of the toe. In a similar way the nose 14 can be moved about over the whole surface of the insole and if a tack or nail is encountered, such as one of those indicated at 38, its point will engage between exposed parts of two adjacent plates 17 and 18 or it will otherwise bridge these plates thus completing the circuit to operate the signalling lamp, buzzer, bell or the like 31, and thus indicate the presence of the offending element.

What I claim then is:

1. A probe for detecting the presence of metallic projections in the interior of articles of footwear, comprising a tubular, elongated body of resilient non-conducting material forming a manipulating handle and having a contracted leading end, a detecting head of smaller depth than the said body and passing into the contracted leading end of this body and engaged therein, said head being constituted by a pack of thin side-by-side plates of conducting material electrically connected in alternation and interleaved by thin plates of insulating material, and a pair of conducting leads connected respectively to each set of interconnected conducting plates, said leads passing rearwardly through said tubular body for connection in a warning electrical circuit.

2. A probe for detecting the presence of metallic projections in the interior of articles of footwear, comprising a sleeve of non-conducting resilient material forming a manipulating handle and having a contracted leading end, a detecting head of smaller depth than said sleeve and constituted by a pack of thin side-by-side plates of conducting material electrically connected in alternation and interleaved by thin plates of insulating material, these plates being located edge-on in relation to the manipulating sleeve, clamping means secured to the outside of this pack of plates to assemble them together and passing, with rear ends of the plates of the pack, into the sleeve and being anchored within this sleeve, and a pair of conducting leads connected respectively to each set of interconnected conducting plates, said leads passing rearwardly through said sleeve for connection in a warning electrical circuit.

3. A probe for detecting the presence of metallic projections in the interior of articles of footwear, comprising a sleeve of non-conducting resilient material forming a manipulating handle and having a contracted leading end, a detecting head of smaller depth than said sleeve constituted by a pack of thin side-by-side plates of conducting material electrically connected in alternation and interleaved by thin plates of insulating material, these plates being of generally rectangular shape, located edge-on in relation to the manipulating sleeve, and dimensioned to give the assembly a curved transverse top and bottom outline, clamping means secured to the outside of this pack of plates to assembly them together and passing, with the rear ends of the plates of the pack, into the sleeve and being anchored within this sleeve, and a pair of conducting leads connected respectively to each set of interconnected conducting plates, said leads passing rearwardly through said sleeve for connection in a warning electrical circuit.

4. A probe for detecting the presence of metallic projections in the interior of articles of footwear, comprising a sleeve of non-conducting resilient material forming a manipulating handle and having a contracted leading end, a detecting head of smaller depth than said sleeve constituted by a pack of thin side-by-side plates of conducting material electrically connected in alternation and interleaved by thin plates of insulating material, these plates being of generally rectangular shape, with the rear ends of the interconnected plates chamfered off in register with each other, and located edge-on in relation to the manipulating sleeve, clamping means secured to the outside of this pack of plates to assemble them together and passing, with the rear ends of the plates of the pack, into the sleeve and being anchored within this sleeve, and a pair of conducting leads connected respectively to each set of interconnected conducting plates, said leads passing rearwardly through said sleeve for connection in a warning electrical circuit.

5. A probe for detecting the presence of metallic projections in the interior of articles of footwear, comprising a tubular elongated body of non-conducting resilient material forming a manipulating handle and having a contracted leading end, a detecting head of smaller depth than the said body extending beyond and passing into the contracted leading end of this body and engaged therein, said head being constituted by a pack of thin side-by-side plates of conducting material electrically connected in alternation and interleaved by thin plates of insulating material, a pair of conducting leads connected respectively to each set of interconnected conducting plates, a terminal box housed in the rear end of said sleeve and providing for connection to said leads and to an external warning circuit, and a removable closure cap for the rear end of said sleeve.

WILLIAM A. LAW.

References Cited in the file of this patent

UNITED STATES PATENTS

| Number | Name | Date |
|---|---|---|
| 902,753 | Marshall | Nov. 3, 1908 |
| 1,437,375 | Young | Nov. 28, 1922 |
| 2,374,821 | Lafond | May 1, 1945 |
| 2,559,627 | Johnson | July 10, 1951 |

FOREIGN PATENTS

| Number | Country | Date |
|---|---|---|
| 760,082 | France | Dec. 6, 1933 |